(12) United States Patent
Pham et al.

(10) Patent No.: US 6,493,803 B1
(45) Date of Patent: Dec. 10, 2002

(54) DIRECT MEMORY ACCESS CONTROLLER WITH CHANNEL WIDTH CONFIGURABILITY SUPPORT

(75) Inventors: Thai H. Pham, Pflugerville, TX (US); Pratik M. Mehta, Austin, TX (US); Michael S. Quimby, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/378,873

(22) Filed: Aug. 23, 1999

(51) Int. Cl.[7] .................................................. C06F 12/00
(52) U.S. Cl. ........................ 711/147; 711/155; 710/66; 710/127; 710/22
(58) Field of Search ........................... 710/66, 127, 22; 711/147, 155

(56) References Cited

U.S. PATENT DOCUMENTS

| | | | | |
|---|---|---|---|---|
| 5,548,786 A | * | 8/1996 | Amini et al. ................... | 710/22 |
| 5,768,557 A | * | 6/1998 | Kulkarni ...................... | 711/146 |
| 5,826,106 A | * | 10/1998 | Pang ............................ | 710/25 |
| 5,954,803 A | * | 9/1999 | Nakai et al. ................... | 710/28 |
| 6,145,027 A | * | 11/2000 | Seshan ......................... | 710/22 |
| 6,163,826 A | * | 12/2000 | Khan et al. .................... | 710/107 |
| 6,167,465 A | * | 12/2000 | Parvin et al. .................. | 710/22 |
| 6,209,042 B1 | * | 3/2001 | Yanagisawa et al. ........... | 710/3 |

OTHER PUBLICATIONS

Elan™SC400 and ElanSC410 Microcontrollers User's Manual, Advanced Micro Devices, Inc., ©1997, pp. 10–1 through 10–10.

Am186©CC/CH/CU Microcontrollers User's Manual, Advanced Micro Devices, Inc., ©1998, pp. 8–1 through 8–44.

* cited by examiner

Primary Examiner—Do Hyun Yoo
Assistant Examiner—Mehdi Namazi
(74) Attorney, Agent, or Firm—Akin Gump Strauss Hauer & Feld LLP

(57) ABSTRACT

A direct memory access (DMA) controller provides seven DMA channels configurable for a PC/AT compatible mode or an enhanced mode. In an enhanced mode of the DMA controller, three DMA master channels on a master DMA controller and a DMA channel on a slave DMA controller are individually configurable to be either 8-bit or 16-bit DMA channels. In addition, in the enhanced mode, a memory address can increment or decrement across a memory page boundary. The DMA controller includes a transfer count register selectively configured for 16-bit operation or 24-bit operation. The DMA controller also includes address generation logic selectively configured for 24-bit operation or 28-bit operation. In the PC/AT compatible mode, the DMA controller supports three 16-bit channels and four 8-bit channels. The DMA controller thus provides DMA channel width configurability.

19 Claims, 10 Drawing Sheets

PC/AT-compatible system

| GPDMA CONTROL (GPDMABCTL) 401 ||||||||
|---|---|---|---|---|---|---|---|
| 7 | 6 | 5 | 4 | 3 | 2 | 1 | 0 |
| CH7_ALT_SIZE 407 | CH6_ALT_SIZE 406 | CH5_ALT_SIZE 404 | CH3_ALT_SIZE 403 | CLOCK_MODE 405 || RESERVED 411 | ENH_MODE_ENB 409 |
| 0 | 0 | 0 | 0 | 0 | 0 | 0 | 0 |
| R/W | R/W | R/W | R/W | R/W || R/W | R/W |

Bit / Reset / R/W shown at left.

FIG. 6a

| 8-BIT GPDMA CHANNEL ADDRESS GENERATION 451 |||
|---|---|---|
| EXTENDED PAGE REGISTERS | GPDMA PAGE REGISTERS | 8-BIT CHANNEL ADDRESS REGISTER |
| A27–A24 | A23–A16 | A15–A0 |

SOURCE ADDRESS

FIG. 6b

| 16-BIT GPDMA CHANNEL ADDRESS GENERATION 461 |||
|---|---|---|
| EXTENDED PAGE REGISTERS | GPDMA PAGE REGISTERS | 16-BIT CHANNEL ADDRESS REGISTER |
| A27–A24 | A23–A17 | A16–A1, A0 = 0 |

SOURCE ADDRESS

FIG. 6c

16-Bit DMA Write

DIRECT MEMORY ACCESS CONTROLLER WITH CHANNEL WIDTH CONFIGURABILITY SUPPORT

BACKGROUND OF THE INVENTION

1. Field of the Invention

This application relates generally to a microcontroller architecture and, more specifically, to a direct memory access (DMA) controller with channel width configurability support.

2. Description of the Related Art

In the late seventies, IBM produced the first personal computer, or PC. PCs quickly became very popular, and companies started developing hardware and software products to support the PC. In 1984, IBM announced the PC/AT computer which soon became a standard adopted by other companies developing PC-based products.

PC/AT compatibility is a standard with no true specification. Instead, the rapid growth of the personal computer industry around the PC/AT machine helped to define the standard. Manufacturers of PC/AT-compatible computers were unable to change this standard because of the huge installed base of software and hardware built for the original PC. Even IBM was helpless to change the standard they had initiated.

Fifteen years later, PC/AT-compatible computers are still being manufactured and sold. Although somewhat amorphous, the PC/AT compatibility standard may nevertheless be defined according to a few key components.

At a software level, PC/AT compatibility implies that a computer is able to run DOS and Windows®. These programs require that a computer include very particular hardware and firmware, however.

First, a main processor, an Intel 8088 or compatible microprocessor, sits at the heart of a PC/AT-compatible system. Essentially, the purpose of the microprocessor is to read instructions from memory and perform the operations specified by the instructions. The operations that may be performed include internal operations such as executing math functions, reading data from external devices, or writing data to external devices.

Thus, to fulfill its purpose, the microprocessor in a computer is typically coupled to a memory and one or more external devices, known as peripheral devices. The coupling of memory and the peripheral devices to the microprocessor is achieved using one or more buses. An ISA bus, short for Industry Standard Architecture, connects one or more peripheral devices to the microprocessor and the memory of a PC/AT-compatible computer.

Other ISA bus features are commonly found in PC/AT computers. The ISA bus supports a 16M memory address space as well as a 1K input/output (I/O) address space. The ISA bus also supports 8-bit and 16-bit data widths. Further, dynamic sizing of the ISA bus is possible in PC/AT-compatible systems.

In order for the devices to communicate, a computer system includes one or more clock signals. The clock(s) enable the various devices to synchronize to one another so that the devices may properly communicate. Further, in a PC/AT-compatible computer system, a set of interval timers provides a programmable frequency source for hardware and software to exploit.

Coupled to the microprocessor by the ISA or other buses, peripheral devices from time to time required service from the microprocessor. In a PC/AT-compatible architecture, peripheral devices use interrupt request lines obtain the attention of the microprocessor. Logic which arbitrates between multiple interrupt requests to the microprocessor in a particular manner is also part of a PC/AT-compatible system.

The ISA bus further supports dynamic cycle timing control using a pin known as IOCHRDY. Also, typically by including an ISA connector, DMA channels and IRQs are provided external to the PC/AT-compatible computer, so that external devices may communicate with the microprocessor and memory.

Another feature of PC/AT-compatible systems is the presence of a real-time clock (RTC) and complementary metal oxide semiconductor (CMOS) random access memory (RAM), a type of low power memory. The RTC and CMOS RAM are connected to a battery such that when the system is powered down, stored information contained in CMOS RAM is retained.

I/O address mapping is fixed in PC/AT-compatible systems, and some PC/AT cards expect address aliasing because only 10 of the 16 available address bits are decoded. Standard PC/AT peripheral devices are direct-mapped in an I/O space from 0000h to 03FFh.

A PC/AT-compatible system includes a particular mapping of its memory, known commonly as dynamic random access memory (DRAM). DRAM is typically addressed in a linear fashion staring at 00000000h and ending at the top of DRAM. Such systems also include a read only memory (ROM) which typically includes firmware which performs a power-on self test (POST) when the computer is first turned on. Further, all PC/AT-compatible systems include firmware known as basic input output system (BIOS). (Without the BIOS in the ROM, DOS and Windows® would not run.) The BIOS provides programs, known as software interrupts, which enable an operating system and application programs to interact with peripheral devices, such as floppy and fixed disk drives, without having to address the hardware directly.

In a PC/AT-compatible system, the BIOS ROMs are mapped over the normal DRAM space. Thus, a windowing mechanism is required to redirect accesses to these spaces out to the ISA bus to access the ROM. Further, to support system management mode (SMM), which is common in many PC/AT computers today, an additional overlay DRAM region, accessible only to the processor, is provided. Additionally, several regions below the top of memory are decoded to support BIOS, expansion ROMs, and a video buffer. To recover these regions, typical PC/AT systems "shadow" these regions (i.e., copy the ROM contents to DRAM) for faster execution.

During system initialization, or POST, instructions are executed by the microprocessor. Because PC/AT-compatible systems are flexible enough to permit system expansion, POST typically includes programs to detect when new hardware has been added to the computer. For example, one of the requirements of POST is to determine the size of memory. Because of the vast array of DRAM types and speeds that are commercially available, a PC/AT-compatible system provides a mechanism to allow POST to determine the type of memory which populates the computer.

In addition to the ISA bus, most PC/AT-compatible systems today include a high performance peripheral component interconnect (PCI) bus. In particular, PCI buses are favored for connecting a video subsystem to the computer. For those PC/AT-compatible systems which implement a PCI bus, a PCI host bridge coupled between the processor bus and the PCI bus maintains a mirror image of the current DRAM size configuration register in order to properly respond to a PCI access. Having this information in the PCI host bridge permits targets on the PCI bus to react more quickly to a request.

For transfers between the peripheral devices and the memory, a PC/AT-compatible system includes logic known as direct memory access (DMA). DMA provides the capability for transfers to be made between peripheral devices and memory while the processor is executing instructions. A PC/AT-compatible system has particular requirements for how DMA channels are configured and organized. For example, the PC/AT supports fly-by DMA transfers only between memory and I/O devices. A fly-by data transfer is one in which data is copied directly from a target device to a requesting device without an intermediate storage step within the DMA device. Memory-to-memory DMA transfers are not supported.

A common device employed to implement DMA in a PC/AT system is the 8237 DMA controller. Originally designed for 8-bit peripherals, special logic is typically included so that the 8237 DMA controller can also service 16-bit peripheral devices. However, a specific DMA channel is only configured for either 8-bit operation or 16-bit operation; DMA address registers are limited to 24 bits; and DMA transfer count registers are limited to 16 bits. In a PC/AT system, three 16-bit channels and four 8-bit channels are supported.

SUMMARY OF THE INVENTION

A direct memory access (DMA) controller of a processor-based device provides a plurality of DMA channels configurable for a PC/AT compatible mode or an enhanced mode. The DMA channels can include three channels on a DMA "master" controller and four channels on a DMA "slave" controller. The DMA master controller and the DMA slave controller are connected in a cascade configuration. In a standard PC/AT compatible mode of the DMA controller, the four slave channels provide 8-bit DMA channels and the three master channels provide 16-bit DMA channels. In an enhanced mode of the DMA controller, each of the three DMA master channels and one of the DMA slave channels are individually configurable to be either 8-bit or 16-bit DMA channels. The plurality of DMA channels thus support DMA width configurability. In addition, in the enhanced mode, a memory address can increment or decrement across a memory page boundary. The DMA controller includes a transfer count register selectively configured for 16-bit operation or 24-bit operation. The DMA controller also includes address generation logic selectively configured for 24-bit operation or 28-bit operation.

A DMA controller according to the described embodiment can operate in a PC/AT compatible mode or an enhanced mode of a system. In the enhanced mode, the DMA controller can provide a 28-bit address space and a 24-bit transfer count. The 28-bit address space enables the DMA controller to address more data than a typical PC/AT compatible DMA controller is able to address. The 24-bit transfer count enables the DMA controller to transfer larger blocks of data than a typical PC/AT compatible DMA controller is able to transfer blocks of data that cross page boundaries.

BRIEF DESCRIPTION OF THE DRAWINGS

A better understanding of the present invention can be obtained when the following detailed description of the invention is considered in conjunction with the following drawings, in which:

FIG. 6a is a illustration of an exemplary GPDMA control register of the GPDMAC of FIG. 3;

FIG. 6b is table showing 8-bit GPDMA channel address generation;

FIG. 6c is table showing 16-bit GPDMA channel address generation;

DETAILED DESCRIPTION OF PREFERRED EMBODIMENT

The following related patent applications are hereby incorporated by reference as if set forth in their entirety:

U.S. Pat. application Ser. No. 09/379,457, entitled FLEXIBLE MICROCONTROLLER ARCHITECTURE, filed Aug. 23, 1999.

U.S. Pat. application Ser. No. 09/379,160, entitled BUFFER CHAINING, filed Aug. 23,1999.

U.S. Pat. application Ser. No. 09/379,456, entitled FLEXIBLE PC/AT-COMPATIBLE MICROCONTROLLER, filed Aug. 23,1999.

MICROCONTROLLER

Figure 1:
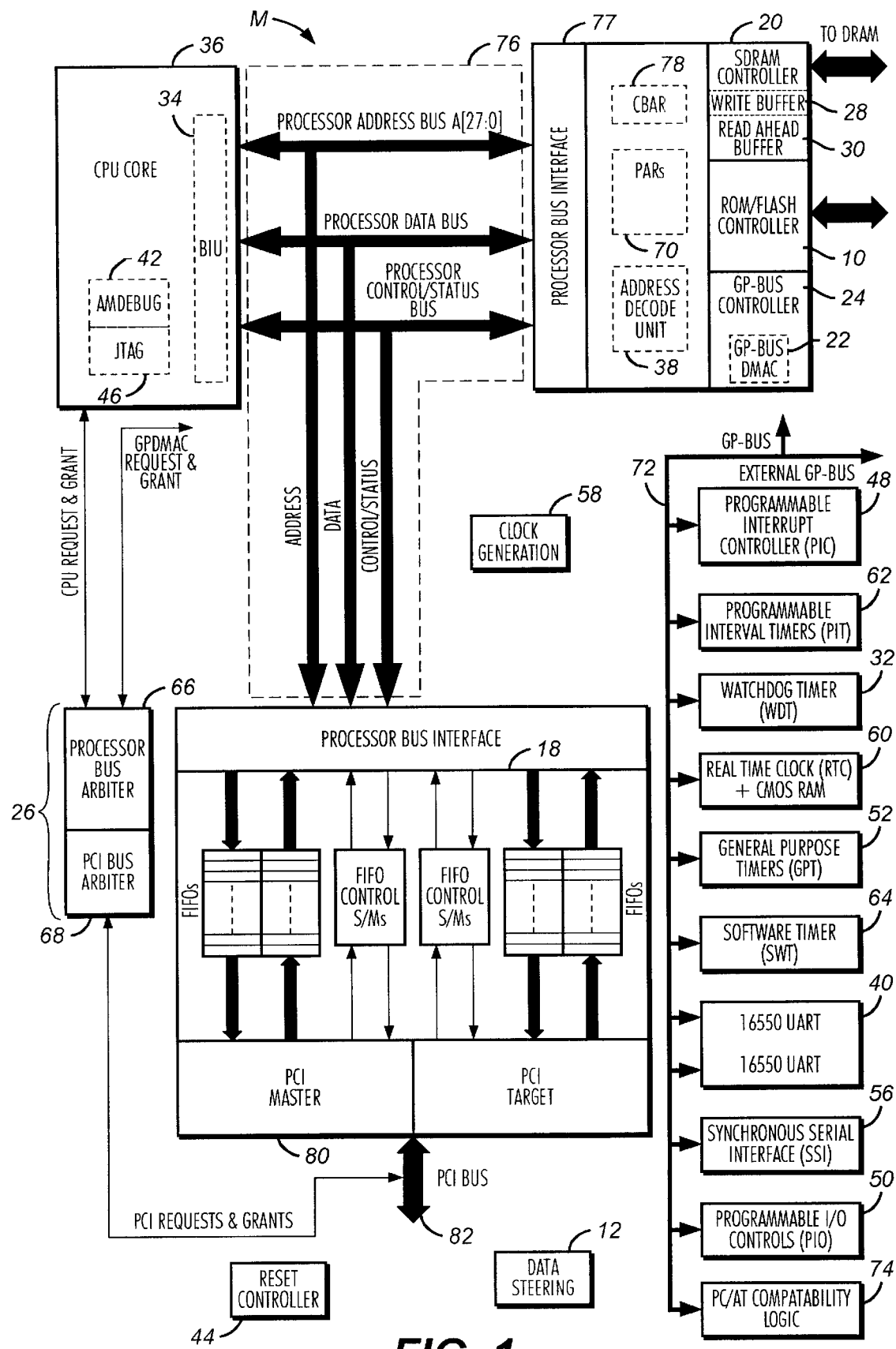
FIG. 1 is a block diagram of a microcontroller.

Turning now to the drawings, FIG. 1 shows a typical microcontroller M in accordance with the present invention. The microcontroller M provides a highly integrated CPU 36 with a complete set of peripherals that are a superset of common PC/AT peripherals and with a set of memory mapped peripherals. In the disclosed exemplary embodiment, the CPU 36 is the Am5x86 CPU core, which utilizes the industry standard x86 microprocessor instruction set. The CPU 36 includes an integrated 16K write back cache.

The microcontroller M provides Programmable Address Region (PAR) registers 70 that enable flexible placement of memory and peripherals into a memory address space and an I/O address space. The PAR registers 70 also allow control of important attributes like cacheability and write protection for memory resources. Both the PAR registers 70 and a Configuration Base Address register (CBAR) 78 serve as address decode registers. While the PAR registers 70 are memory-mapped, the CBAR 78 is direct-mapped to I/O.

An address decoding unit (ADU) 38 provides flexible distributed memory and I/O address decode logic. Address decode is distributed between a general purpose (GP)-Bus Controller 24, memory controllers such as a read-only memory (ROM) controller 10 and a dynamic random access memory (DRAM) controller 20, and a Peripheral Component Interconnect (PCI) bus 82. PC/AT-compatible peripherals are direct-mapped to I/O, and remaining integrated peripherals are memory-mapped. The memory space and I/O space of a general purpose bus ("GP bus") 72 are accessible by the CPU 36. The memory space and I/O space of the PCI bus 82 are accessible by the CPU 36, the PCI master controller 80, and external PCI bus masters.

A system arbiter 26 includes a processor bus arbiter 66 for performing arbitration for a processor bus 76 and a PCI bus arbiter 68 for performing arbitration for the PCI Bus 82. The processor bus 76 is shown divided into address, data and control portions. The address portion of the processor bus 76 includes 28 signals designated as A27 through A0. The processor bus arbiter 66 may arbitrate between several possible processor bus masters. For example, the processor bus arbiter 66 may handle requests for the CPU 36, the general purpose bus DMA controller 22, and the PCI host bridge 18 on behalf of an external bus master requesting access to DRAM. The PCI bus arbiter 68 may arbitrate between five possible PCI masters.

A processor bus interface (PBI) 77 integrated with the CPU 36 is responsible for DMA cache snooping, dynamic clock speed adjusting, dynamic bus sizing, ready signal consolidation, Memory Mapped Configuration Region (MMCR) control, and general purpose address control. A bus interface unit (BIU) 34 basically assists the CPU 36 with bus, DMA, and memory control.

A clocks module 58 provides oscillators and phase locked loops (PLLs) to support pads 16, the DRAM controller 20, universal asynchronous receiver transmitters (UARTs) 40, general purpose timers (GPT) 52, and a real-time clock (RTC) 60.

The DRAM controller 20 provides synchronous DRAM (SDRAM) support, symmetric and asymmetrical DRAM support, SDRAM auto refresh support, SDRAM Error Correction Code (ECC) support, DRAM write buffering support, DRAM read pre-fetching support, read-around-write support, and support for up to 256 megabytes of DRAM. The DRAM controller 20 may service requests from the CPU 36, the PCI host bridge 18 on behalf of an external PCI master, or the GP-bus DMA controller and may issue commands to SDRAM devices. DRAM cycles may be also be initiated by a write buffer 28 or a read-ahead buffer 30 internal to the DRAM controller 20. The write buffer 28 and the read-ahead buffer 30 together provide buffering techniques to optimize DRAM system performance.

A data steering block 12 stores data and routes data as needed from 8/16-bit devices from/to the GP-bus 72 to/from a CPU bus. On DMA SDRAM reads, the data steering block 12 may save data until the next address strobe.

A general purpose bus controller 24 controls the GP-bus 72, an internal and external bus that connects 8 bit- or 16-bit peripherals to the microcontroller M without glue logic. Features of the controller 24 include 8 external chip selects, programmable bus interface timing, "ready" signal support for external devices, and support for 8/16-bit I/O and memory mapped I/O cycles. In the disclosed embodiment, the GP-bus 72 supports a programmable interrupt controller (PIC) 48, a programmable interval timer (PIT) 62, a watchdog timer (WDT) 32, the real-time clock (RTC) 60, the general purpose timers (GPT) 52, a software timer (SWT) 64, UARTs 40, a synchronous serial interface (SSI) 56, programmable I/O logic 50, and PC/AT compatibility logic 74.

The microcontroller M includes the GP-bus DMA controller 22 on the GP-bus 72. The GP-bus DMA controller 22 is shown integrated with the general purpose bus controller 24. The GP-bus DMA controller 22 is designed to handle any DMA accesses between general purpose bus peripherals (internal or external) and DRAM. Features of the GP-bus DMA controller 22 includes support for up to 7 DMA request channels (with a maximum of 4 external requests), support for three 16-bit channels and four 8-bit channels, buffer chaining capability in an enhanced mode, fly-by (single cycle) transfers between general purpose bus peripherals and DRAM, and variable clock modes. The GP-bus DMA controller 22 is PC/AT-compatible.

A PIO (programmable I/O) unit 50 provides PIO logic to support 32 programmable I/O signals (PIOs) to monitor signals and control devices not handled by other functions of the microcontroller M. The PIOs are shared with other functions on the microcontroller M.

A timers unit 52 provides general purpose timers for generic timing or counting applications. Features of the timers unit 52 include three 16-bit timers, two-stage cascading of timers, and several modes of operations.

An in-circuit emulator (AMDebug) core 42 provides an integrated debug interface for embedded hardware/software debug during a special debug mode, AMDebug mode. Controllability and observability may be achieved through a fast JTAG-compliant serial interface.

A PCI host bridge 18 is integrated into the microcontroller M which allows the CPU 36 to generate PCI master transactions and allows external PCI masters to access the microcontroller DRAM space. The PCI host bridge 18 may be a 33 MHz, 32-bit PCI Bus Revision 2.2-compliant host bridge interface.

A PIC 48 includes 3 industry standard programmable interrupt controllers (PICs) integrated together with a highly programmable interrupt router. Two of the PICs 48 may be cascaded as slaves to a master PIC which arbitrates interrupt requests from various sources to the CPU 36. The PICs 48 may be programmed to operate in PC/AT-compatible mode. The router may handle routing of 33 various external and internal interrupt sources to the 22 interrupt channels of the three PICs.

A programmable interval timer (PIT) 62, which is compatible to 8254 PIT circuitry, is provided. The PIT 62 provides three 16-bit general purpose programmable channels, six programmable counter modes, and binary and BCD counting support.

The microcontroller M further includes an integrated reset controller 44 to control the generation of soft or hard resets to the CPU 36 and system resets to the various internal cores. The reset controller 44 provides a control bit to enable AMDebug mode after the CPU 36 has been reset.

An integrated ROM/Flash controller 100 provides a glueless interface to up to three ROMs, EPROMs or flash devices. It supports asynchronous and advanced page-mode devices.

The RTC block 60 is compatible with the Motorola MC 146818A device used in PC/AT systems. The RTC 60 supports binary or BCD representation of time, calendar, and alarm, its own power pin and reset, 14 bytes of clock and coil registers, 114 bytes of general purpose RAM, three interrupts sources, battery backup capability, and an internal RTC reset signal to perform a reset at power-up.

A synchronous serial interface (SSI) 56 provides efficient full-duplex and half-duplex, bi-directional communications to peripheral devices. Other features include clock speed programmable from 64 KHz to 8 MHz and multiple device enables.

A software timer (SWT) 64 is a peripheral on the GP-Bus 72 which provides a millisecond time base with microsecond resolution timing for software. The peripheral 64 includes a 16-bit millisecond up counter and a 10-bit millisecond up counter.

A test controller block 46 includes test logic such as the JTAG controller. The test logic is provided to test and ensure that the components of the microcontroller M function correctly.

A UART block 40 includes two PC16550-compatible UARTs, both capable of running 16450 and 16550 software. The UART block 40 supports DMA operation, a FIFO mode, an internal baud rate clock to handle baud rates up to 1.5M bits/s, false start bit detection, break detection, full-duplex operation, and other features.

A watchdog timer block (WDT) 32 is a mechanism to allow system software to regain control of the microcontroller M when the software fails to behave as expected. The watchdog timer block 32 supports up to a 30-second timeout with a 33 MHz CPU clock.

The PC/AT compatibility logic 74 provides PC/AT compatible functions. The PC/AT compatible integrated peripherals include the GP-bus DMA controller 22, the PIT 62, the PIC 48, the UARTs 40, and the RTC 60.

This particular microcontroller is illustrative. The techniques and circuitry according to the invention could be applied to a wide variety of microcontrollers and other similar environments. The term "microcontroller" itself has differing definitions in industry. Some companies refer to a processor core with additional features (such as I/O) as a "microprocessor" if it has no onboard memory, and digital signal processors (DSPs) are now used for both special and general purpose controller functions. As here used, the term "microcontroller" covers all of the products, and generally means an execution unit with added functionality all implemented on a single monolithic integrated circuit.

PC/AT COMPATIBILITY

Figure 2:
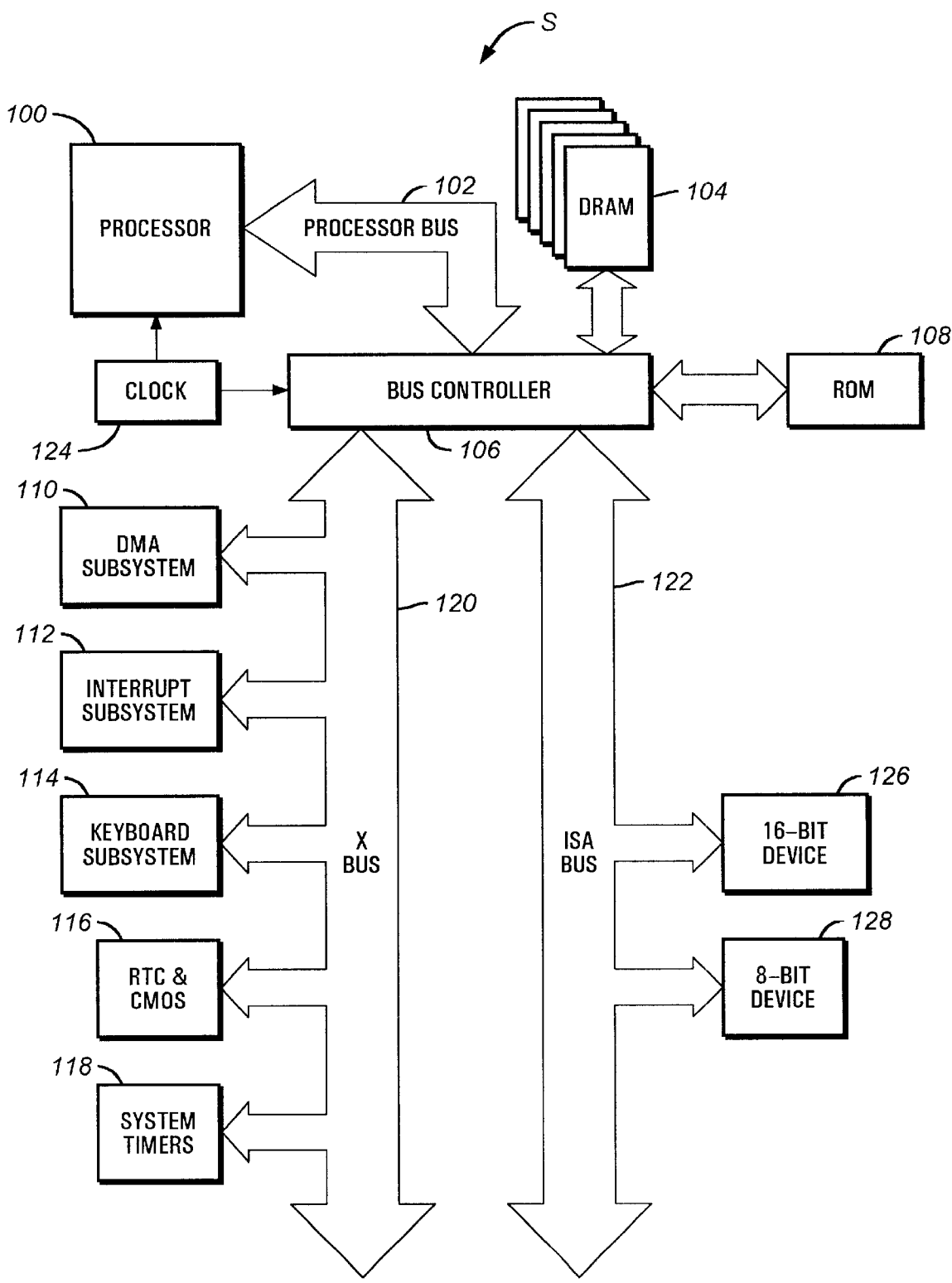
FIG. 2 is a block diagram of a typical PC/AT compatible system.

FIG. 2 is a block diagram of a computer system S used to illustrate some of the basic hardware features of a PC/AT-compatible computer. First, a processor 100, also known as a microprocessor, is shown. PC/AT-compatible systems are based upon the Intel 8086 or compatible microprocessors. The 80286, 80386, 80486, and Pentium microprocessors are all considered PC/AT-compatible to 8086 microprocessors.

FIG. 2 also shows a processor bus 102. The processor bus 102 connects the processor 100 to the other components of the computer systems and provides a pathway for address, data, and control signals to traverse.

Next, a bus controller 106 is shown. The bus controller 106 contains logic which helps the processor 100 communicate with external devices. A ROM device 108 is shown coupled to the bus controller 106. The ROM 108 contains firmware instructions which are executed by the processor 100 when the computer system S is powered up. Also shown coupled to the bus controller 106 is a memory or DRAM 104. The DRAM 104 contains data and, for example, instructions that the processor 100 executes.

A clock 124 is also shown as input to both the processor 100 and the bus controller 106. The clock 124 enables synchronization of these and other devices so that the processor 100 can communicate with other devices in the computer system S.

FIG. 2 shows two additional buses, an X bus 120 and an industry standard architecture (ISA) bus 122. The ISA bus 122 is a standard component of all PC/AT-compatible systems. The X bus 120 is simply a buffered version of the ISA bus 122. As shown in FIG. 2, several components of PC/AT-compatible systems are connected to the system through the X bus 120. These components include a DMA subsystem 110, an interrupt subsystem 112, a keyboard subsystem 114, a real-time clock and CMOS RAM subsystem 116, and system timers 118.

The ISA bus 122 has several features that are discussed in more detail below. The function of the ISA bus 122 is to provide a mechanism for 8- or 16-bit devices to be added to the computer system S such that the devices may interact with the other circuitry of the computer system S. For example, an external device may need to interrupt the processor 100. Accordingly, the device needs to interact with the interrupt subsystem 112. Adherence to ISA bus 122 requirements makes such interaction possible. FIG. 2 shows a 16-bit device 126 and an 8-bit device 128 connected to the ISA bus 122. These devices may be either soldered on the system board or they may be connected via an ISA expansion slot connector. An example of an 8-bit device is a floppy disk drive controller while a fixed disk drive controller is a commonly used 16-bit device. Both are typically found in PC/AT systems.

GP-BUS DMA CONTROLLER

Figure 3:
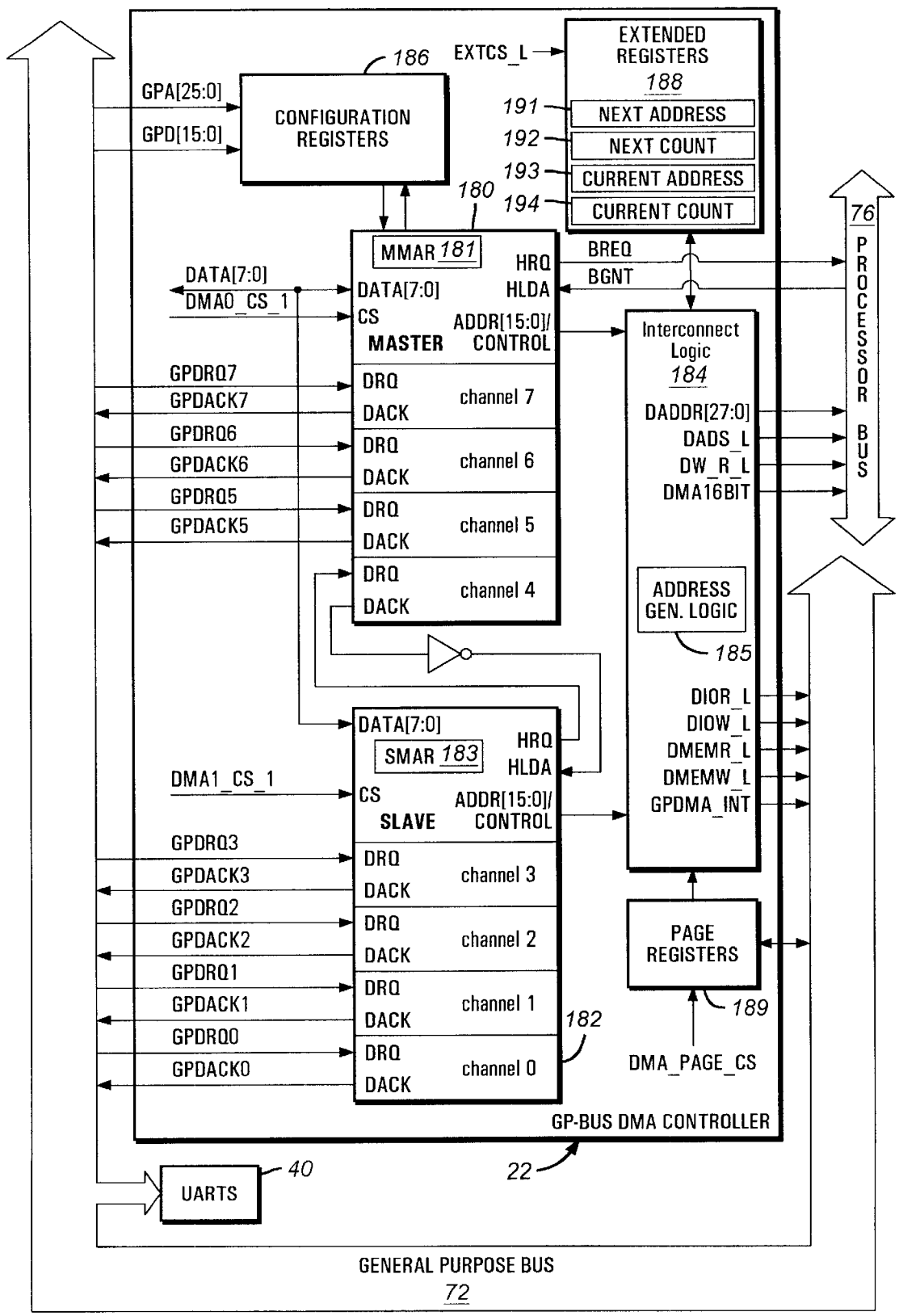
FIG. 3 is a block diagram of the circuitry of the exemplary general purpose bus direct memory access controller (GPDMAC) of FIG. 1.

FIG. 3 is a block diagram of the exemplary GP-bus DMA controller 22 introduced in FIG. 1. The GP-bus DMA controller 22 includes two cascaded GP-bus DMA controllers. A first controller, shown as a master DMA controller 180, includes channels 4 through 7. A second controller, shown as a slave DMA controller 182, includes channels 0 through 3.

As FIG. 3 shows, the hold request signal, HRQ, of the slave DMA controller 182 is coupled to a DMA request signal, DRQ, for channel 4 of the master 180. Likewise, the DMA hold acknowledge signal, HDLA, of the slave DMA controller 182 is coupled to an acknowledge signal, DACK, for channel 4 of the master DMA controller 180. This coupling of the master DMA controller 180 and the slave DMA controller 182 accords with the PC/AT compatibility requirements. The channel selected for data transfer, or the "active" channel, is determined by the master DMA controller 180 and the slave DMA controller 182.

In the illustrative system, channels 0 through 3 of the slave DMA controller 182 support 8-bit data transfers between 8-bit I/O devices and system DRAM. Address generation logic 185 of interconnect logic 184 of the GP-bus DMA controller 22 is only 16 bits wide. Accordingly, 8-bit DMA requests can access memory addressed only up to 64K.

The typical memory access limit for PC/AT compatible systems is supported by the microcontroller M using a set of page registers 189, one for each DMA channel, for a total of seven DMA page registers (not shown). These seven 8-bit page registers extend the accessible address range from 64K to 16M. In the enhanced mode, the microcontroller M further provides four extended page registers (not shown) within extended registers 188, further extending the address space available to the GP-bus DMA controller 22 of the microcontroller M to 256M. The extended registers 188 can be accessed from the processor bus 76 by a direct read/write to their addresses and are also connected to the GP-bus 72. An EXTCS_L signal is asserted by the ADU 38 to indicate to the extended registers 188 that an address has been decoded.

The extended registers 188 include next address registers 191, next transfer count ("next count") registers 192, current address registers 193 and current transfer count ("current count") registers 194. In a disclosed embodiment, the next address registers 191 include a 16-bit address low register and a 16-bit address high register for each buffer chaining capable channel. In a disclosed embodiment, the buffer chaining capable channels are the same as configurable width channels or, in other words channel 3 of the slave DMA controller 182 and channels 5, channel 6 and channel 7 of the master DMA controller 180. Alternatively, other DMA channels can support buffer chaining and width configurability, and the two sets of channels need not be the same. Furthermore, in a disclosed embodiment, bits 12 through 15 of each 16-bit high address register are reserved for future use. Employed in pairs, the address high register and the address low register for each channel define a 28-bit, or 256M, address space.

The next count registers 192 include a 16-bit count low register and an 8-bit count high register for each buffer chaining capable channel. The next count registers 192 and the current count registers 194 hold information relating to the size of a DMA buffer containing data that is to be transferred. The next address count registers 192 contain information about the size of a next buffer in a chain, and the next address registers 191 store information about the location in memory of the next buffer in the chain. The current count registers 194 store information about the location of the current buffer in the chain, and the current address registers 193 store information about the size of the current buffer in the chain.

During an 8-bit DMA transfer, a slave memory address register (SMAR) 183 of the DMA slave controller 182 provides address bits A15–A0 of the address portion of the processor bus 76 (FIG. 1); one of the DMA page registers 189 provides address bits A23 through A16; and one of the extended page registers of the extended registers 188 provides address bits A27 through A24 of the requested address in system memory. An 8-bit addressing scheme is described in more detail below in conjunction with FIG. 6b. In the disclosed embodiment, the target of an operation of the GP-bus DMA controller 22 is the DRAM. A total address range of 256M is thus available to the slave DMA controller 182 for performing 8-bit memory transfers.

To support PC/AT compatibility, the master DMA controller 180 of the microcontroller M shifts the lowest address line, A0, to accommodate 16-bit DMA transfers. The A0 address line is set to a value of '0' corresponding to a word-aligned memory location of a 16 bit data transfer. The shifting of the A0 line to the master DMA controller 180 accommodates a word transfer requirement of the master DMA controller 180 which is understood in the art. A 16-bit addressing scheme is described in more detail below in conjunction with FIG. 6c.

Channels 5 through 7 of the master DMA controller 180 support 16-bit data transfers between 16-bit I/O devices and system DRAM. In the disclosed embodiment, 16-bit DMA may access any even (word-aligned) location within the system address space. During a 16-bit DMA transfer, the address of a target is provided on A27–A1 of the address portion of the processor bus 76 (FIG. 1). The lowest address line, A0, is forced low; a master memory address register (MMAR) 181 of the master DMA controller 180 supplies address bits A16 through A1; the DMA page registers 189 provide address bits A23 through A17; and one of the extended page registers of the extended registers 188 provides address bits A27 through A24 of the requested address in system memory. As with 8-bit transfers, 16-bit DMA requests can access memory up to 256M. This special addressing scheme in the master DMA controller 180 thus accommodates 16-bit data transfers and fulfills compatibility requirements for PC/AT applications.

The seven DMA channels, each associated with a GPDRQ signal and a GPDACK signal, are shown connected to the GP-bus 72, first shown in FIG. 1. Channel 0 is associated with a GPDRQ0 signal and aGPDACK0 signal; channel 1 is associated with a GPDRQ1 signal and a GPDACK1 signal, and so on for all seven channels. The GPDRQ and the GPDACK signals are referred to collectively as GPDRQ[3:0] and GPDACK[3:0] respectively. It should be noted that in the described embodiment, when a specific GPDRQ signal or GPDACK signal is specified, the GPDRQO signal and the GPDACKO signal are used as examples but that the corresponding GPRQ[3:0] signal or GPACK[3:0] signal would be used for any particular channel.

In the microcontroller M, the initiator is either an external I/O device or memory-mapped I/O device residing on the GP-bus 72. For example, the initiator of a DMA request is any I/O device that asserts the GPDRQ signal. Either an 8-bit transfer using channels 0–3 or a 16-bit transfer using channels 5–7 may be initiated by one of these devices. Alternatively, the initiator may be the internal UARTs 40 of the microcontroller M, although the UARTs in a disclosed embodiment may initiate DMA transfers only through the 8-bit channels. For the GP-bus DMA controller 22, the target is DRAM. Because of this, the relevant address range is currently mapped to the system DRAM.

Thus, for the microcontroller M, DMA requests may originate from either the internal UARTs 40 or from an I/O or memory-mapped device connected to the GP-bus 72, including those I/O or memory-mapped devices which are external to the microcontroller M. In a disclosed embodiment, an 8-bit I/O or memory-mapped device can use any of the DMA channels from the slave DMA controller 182 while a 16-bit I/O or memory-mapped device can use any of the DMA channels from the master DMA controller 180 (except channel 4 which is used to implement the cascade feature of the master and slave DMA controllers 180 and 182). Each I/O or memory-mapped device is assigned a GPDRQ/GPDACK signal pair. The microcontroller M provides for programmability of these signals In compliance with PC/AT requirements, the default polarities of GPDRQ and GPDACK are active high and low, respectively.

During a read transfer, the external I/O device asserts its request (GPDRQ) and then waits for an acknowledgement (GPDACK). Subsequently, the external I/O device latches the data from the GP-bus 72 when an I/O command (DIOW_L) is asserted by the interconnect logic 184. For a write transfer, the external I/O device asserts its request (GPDRQ), waits for the acknowledge signal (GPDACK), and places the data on the GP-bus 72 when an I/O command (DIOR_L) is asserted by the interconnect logic 184.

Because the microcontroller M provides that external devices on the GP-bus 72 may be mapped into memory address space, memory-mapped I/O devices like other I/O devices can execute DMA transactions. One difference, however, is that the signals asserted by memory-mapped I/O devices are DMEMR_L and DMEMW_L instead of DIOR_L and DIOW_L. A BREQ signal is asserted to request the GP-bus 72 when the DMA controller 22 has an active request. A BGNT signal is asserted by the system arbiter 26 when the DMA controller 22 has been granted use of the GP-bus 72.

The DMA controller 22 is connected to the BIU 34 by means of a DADS_L signal, a DADDR[27:0] bus, a DW_R_L signal and a DMA16BIT signal. The DMA16BIT is used by the BIU 34 to determine whether the an address is 8 bits or 16 bits. The DADS_L signal is asserted to indicate that a valid DMA address is on the DADDR[27:0] bus. The DADDR[27:0] bus is formed from signals from the extended registers 188, the page registers 189 and either an ADDR[15:0]/CONTROL bus of the master DMA controller 180 or an ADDR[15:0]/CONTROL bus of the slave DMA controller 182. The DADDR[27:0] bus provides memory addresses during a DMA transfer in response to memory read and write cycles. The DW_R_L signal indicates whether a memory write cycle or a memory read cycle is occurring. The DMA16BIT signal is asserted by the DMA controller 22 when the initiator of a DMA request is a 16-bit device.

The GP-bus DMA controller 22 supports two modes: a PC/AT-compatible mode and an enhanced mode. In PC/AT-compatible mode, the GP-bus DMA controller 22 supports three 16-bit channels and four 8-bit channels. Address generation logic 185 of the DMA controller 22 is only 16 bits wide in the PC/AT compatible mode, such that 8-bit DMA requests cannot cross 64 Kbyte boundaries and 16-bit DMA requests cannot cross 128 Kbyte physical page boundaries. In the enhanced mode, four channels are individually configurable to be either 8-bit or 16-bit and the address generation logic is increased to 28-bits wide, eliminating both the 64 Kbyte restriction on 8-bit DMA requests and the 128 Kbyte restrictions on 16-bit DMA requests. Enhanced mode also supports a 24-bit transfer count to enable larger data transfers. In addition, enhanced mode supports buffer chaining capability which is described in more detail in a commonly assigned patent application entitled "BUFFER CHAINING," previously incorporated by reference.

The GP-bus DMA controller 22 also supports variable clock modes at either 16, 8, or 4 MHz. The internal state machines of the GP-bus DMA controller 22 are locked by the input 33 Mhz clock. The I/O command signals from an initiator or the CPU 36 are scaled down to the selected 4 MHz operating frequency to support PC/AT compatibility.

FIG. 3 shows a set of configuration registers 186 which are part of the GP-bus DMA controller 22. The configuration registers 186 include seven page registers (not shown). The address decode unit (ADU) 38, shown in FIG. 1, asserts a chip select for these configuration registers 186 when the CPU 36 of FIG. 1 accesses the page registers. For PC/AT compatibility, the GP-bus DMA controller 22 also includes nine general page registers. These registers are 8 bits wide and are located at I/O addresses 80h, 84h–86h, 88h, and 8Ch–8Fh.

The interconnect logic 184 also asserts a GPTC (general purpose terminal count) signal (FIG. 7) when a transfer count of an active channel has rolled from 0h to FFFFh in an 8-bit channel or from 0h to FFFFFFh in an enhanced mode channel 3, 5, 6 or 7. A GPAEN (general purpose address enable) signal (not shown) indicates to memory-mapped devices residing on the GP-Bus 72 that a DMA cycle is active and therefore the address on the GP-bus 72 should not be decoded.

Figure 4:
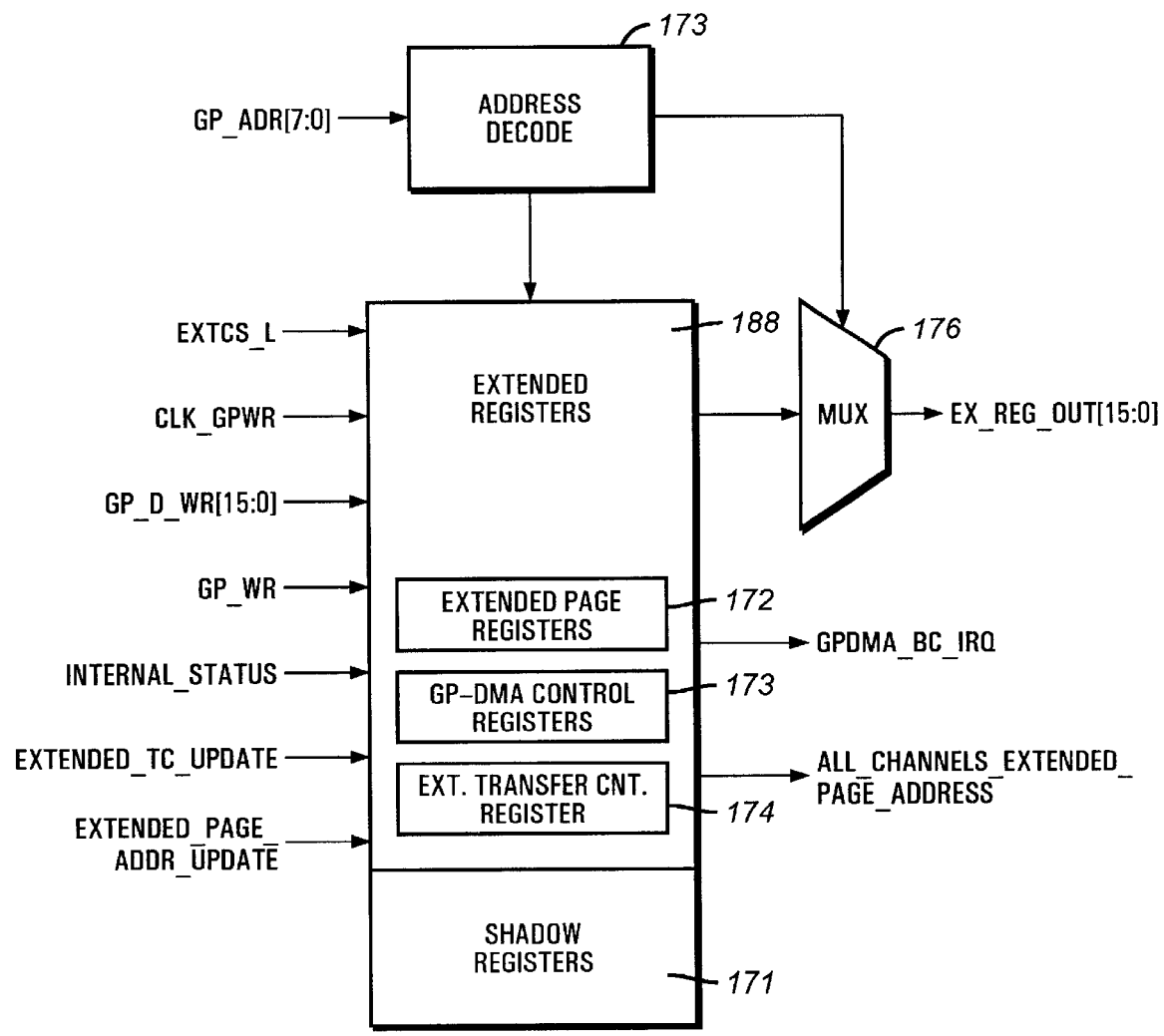
FIG. 4 is a block diagram of the extended registers illustrated in FIG. 3.

Turning now to FIG. 4, illustrated is a block diagram of the extended registers 188 first described in conjunction with FIG. 3. The extended registers 188 include shadow registers 171, extended page registers 172, a GP-DMA control register 401 (see FIG. 6a) and extended transfer count registers 174. The extended registers 188 are accessed through the processor bus 76 by a direct read/write to their respective addresses. In the disclosed embodiment, if the DMA controller 22 is operating in an enhanced mode, the values of both extended page registers 172 and the extended transfer count registers 174 for channels 3 and 5–7 of the DMA controller 22 are stored in the shadow registers 171 at the beginning of a DMA cycle. Unlike a typical DMA controller, the DMa controller 22 of the described embodiment can tansfer a data buffer that extends across a page boundary and, therefore, the value of both the extended page registers 172 and the extended transfer count registers 174 may change during the transfer of the contents of a data buffer. During an autoinit (autoinitiation) mode of the DMA controller 22, the values stored in the shadow registers 171 are copied to the corresponding extended page registers 172 and the extended transfer count registers 174. Thus the original values of the extended page registers 172 and the extended tranfer count registers 174 can be restored during the autoinit mode.

An address decode unit (ADU) 173 decodes an address of a specific extended address register based upon the signals on GP_ADR[7:0], provides the address signals to a mux 176 and then asserts an EXTCS_L signal to the extended registers 188. Upon receipt of the EXTCS_L signal, the extended registers 188 provide to the mux 176 the contents of the appropriate extended page register as determined by the ADU 173 within the extended page registers 172. The mux 176 combines the output of the address decoder 173 and the extended registers 188 into a EX_REG_OUT[15:0] signal.

In the described embodiment, a CLK_GPWR signal is a write strobe clock and a GP_WR signal is a GP-bus 72 write strobe. GP_D_WR[15:0] signals carry data to be written either to the GP-DMA control register 401; the extended page registers 172 or the extended transfer count registers 174 depending upon the state of an EXTENDED_TC_UPDATE signal and an EXTENDED_PAGE_ADDR_UPDATE signal. A GPDMA_BC_IRQ signal is asserted by the extended registers 188 to signal the processor 36 that a transmission of the contents of a chained data buffer has been completed. More details about the buffer chaining capability of the GP-bus DMA controller 22 is available in the commonly assigned patent application, entitled "BUFFER CHAINING" previously incorporated by reference. Finally, ALL_CHANNELS_EXTENDED_PAGE_ADDRESS signals contains the extended page address of the active channel.

Figure 5:
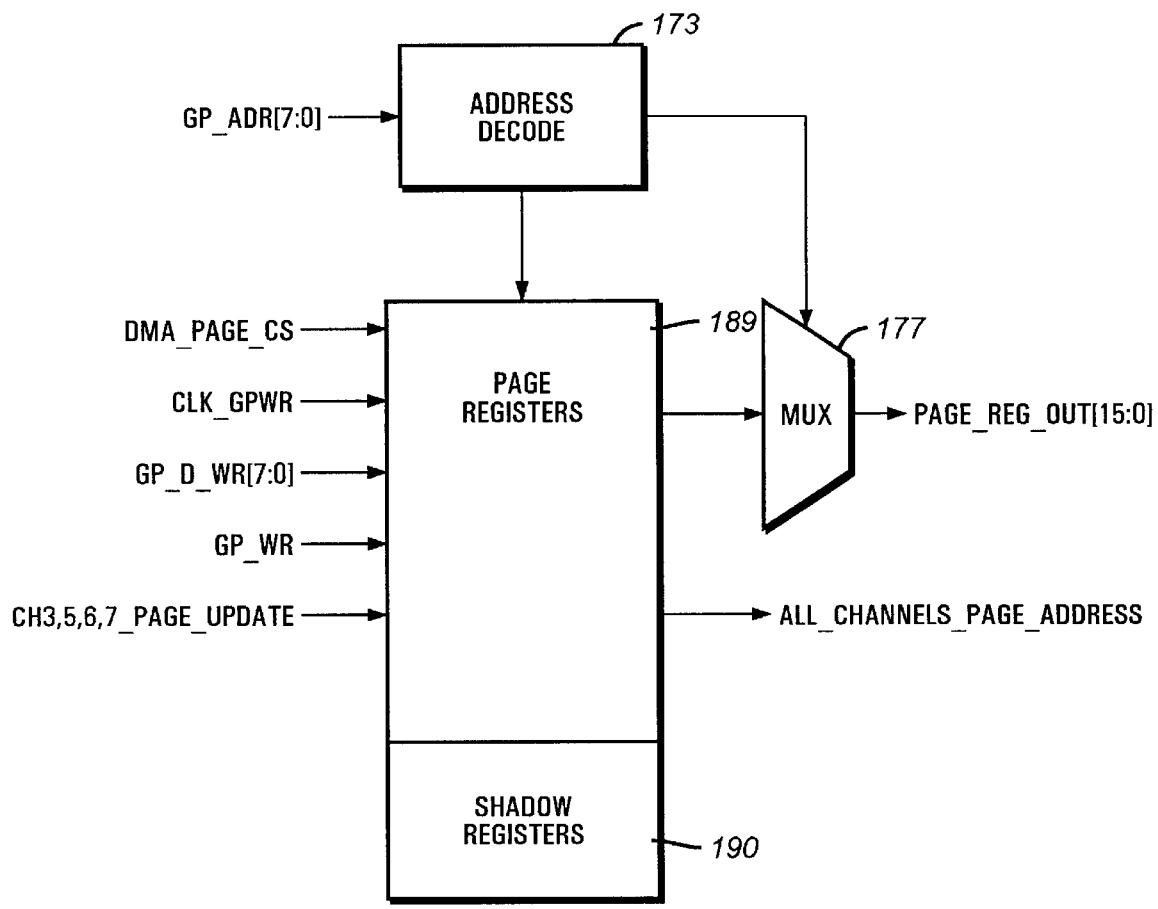
FIG. 5 is a block diagram of the page registers illustrated in FIG. 3.

Turning now to FIG. 5, illustrated is a block diagram of the seven registers first described in conjunction with FIG. 3. The page registers 189 include nine page registers (not shown). Page shadow registers 190 provide a similar function in the page registers 189 as do the shadow registers 171 provide in the extended registers 188; during an autoinit in enhanced mode, the page registers 189 are restored to the values stored at the beginning of a DMA transfer that has been halted in progress. An ADU 173 provides the page registers 189 with the address of a particular channel depending upon the value of the GP_ADR[7:0] signals. The ADU 173 asserts a DMA_PAGE_CS signal when the CPU 36 is accessing the page registers 189. In the same fashion as in the extended registers, the CLK_GPWR signal is a write strobe clock and a GP_WR signal is a GP-bus 72 write strobe. GP_D_WR[7:0] signals carry data to the page registers 189. CH3,5,7,7_PAGE_UPDATE signals are used to update the page register of the active channel. Finally, ALL_CHANNELS_PAGE_ADDRESS signals contains the page address of the active channel.

Turning now to FIG. 6a, illustrated is a general purpose direct memory address control register (GPDMABCTL) 401. In the disclosed embodiment, the GPDMABCTL 401 is included in the configuration registers 186 (FIG. 3). A ENH_MODE_ENB bit 409 is the 0 bit of the GPDMABCTL register 401 and may be both read and written (R/W). When the GP-bus DMA controller 22 is reset, the ENH_MODE_ENB bit 409 is set to the value of '0'. When not in the enhanced mode, the GP-bus DMA controller 22, in the described embodiment, is PC/AT compatible. When the ENH_MODE_ENB bit 409 is set to a value of '1', the GP-bus DMA controller 22 is in an enhanced mode and the configurable width channel features of the disclosed embodiment are enabled as described below.

The GPDMABCTL 401 also includes a reserved bit 411, CLK_MODE bits 405, a CH3_ALT_SIZE bit 403, a CH5_ALT_SIZE bit 405, a CH6_ALT_SIZE bit 406 and a CH7_ALT_SIZE bit 407. The reserved bit 401 is not used in the disclosed embodiment and is typically set to '0' in normal system operation. The CLK_MODE bits 405 include bit 2 and bit 3 of the GPDMABCTL 401 and are used to set the operating speed of the GP-bus DMA controller 22. A value of "00" written to the CLK_MODE bits 405 corresponds to a speed of 4 Mhz; a value of "01" corresponds to a speed of 8 Mhz; and a value of "10" corresponds to a speed of 16 Mhz. A value of "11" written to the CLK_MODE bits 405 is not defined in the disclosed embodiment at this time but is instead reserved for future use.

According to the described embodiment, the CH3_ALT_SIZE bit 403 signals the GP-bus DMA controller 22 whether channel 3 of the DMA slave controller 182 is configured for 8-bit or 16-bit operation, a value of '0' indicating 8-bit operation and a value of '1' indicating 16-bit operation. In a similar manner, the CH5_ALT_SIZE bit 405, the CH6_ALT_SIZE bit 406 and the CH7_ALT_SIZE bit 407 signal the GP-bus DMA controller 22 whether channel 5, channel 6 or channel 7 respectively of the DMA master controller 180 are configured for 8-bit or 16-bit operation. The CH3_ALT_SIZE bit 403, the CH5_ALT_SIZE bit 405, the CH6_ALT_SIZE bit 406 and the CH7_ALT_SIZE bit 407 are checked by the GP-bus DMA controller during a data transfer operation so that the desired width configuration is implemented.

Turning now to FIG. 6b, illustrated is an 8-bit GPDMA channel address generation ("8-bit") table 451 describing the source of an 8-bit channel address generated by the address generation logic 185 described above in conjunction with FIG. 3. The first row in the 8-bit table specifies the source of a particular group of bits and the second row specifies a portion of the address bus of the processor bus 76 to which the particular group of bits are provided. For example, data bits A15–A0 are provided by the slave memory address register 183 of the slave DMA controller 182, both described above in conjunction with FIG. 3. Data bits A23–A16 are provided by the GPDMA page registers of the page registers 189 described above in conjunction with FIG. 5 and the data bits A27–A24 are provided by the extended page registers 172 of the extended registers 188, both described above in conjunction with FIG. 4. The data bits A27–A24 are not provided in a PC/AT compatible transaction because they are not consistent with a 24 bit address PC/AT compatibility requirement. The data bits A27–A24 are provided, however, when the GP-bus DMA controller 22 is operating in the enhanced mode.

Turning now to FIG. 6c, illustrated is a 16-bit GPDMA channel address generation ("16-bit") table 461 describing the source of a 16-bit channel address generated by the address generation logic 185 described above in conjunction with FIG. 3. The first row in the 16-bit table specifies the source of a particular group of bits and the second row specifies a portion of the address bus of the processor bus 76 to which the particular group of bits are provided. For example, data bits A16–A1 are provided by the master memory address register 181 of the master DMA controller 180, both described above in conjunction with FIG. 3, and data bit A0 is set to a value of '0'. The value of bit A0 is consistent with a 16-bit channel requirement that a data transfer start on a word boundary. Data bits A23–A17 are provided by the GPDMA page registers of the page registers 189 described above in conjunction with FIG. 5 and the data bits A27–A24 are provided by the extended page registers 172 of the extended registers 188, both described above in conjunction with FIG. 4. In a fashion similar to the 8-bit channel address generation described above in conjunction with FIG. 6b, the data bits A27–A24 are not provided in a PC/AT compatible transaction because they are not consistent with the 24 bit address PC/AT compatibility requirement. The data bits are provided, however, when the GP-bus DMA controller 22 is operating in the enhanced mode.

Figure 7:
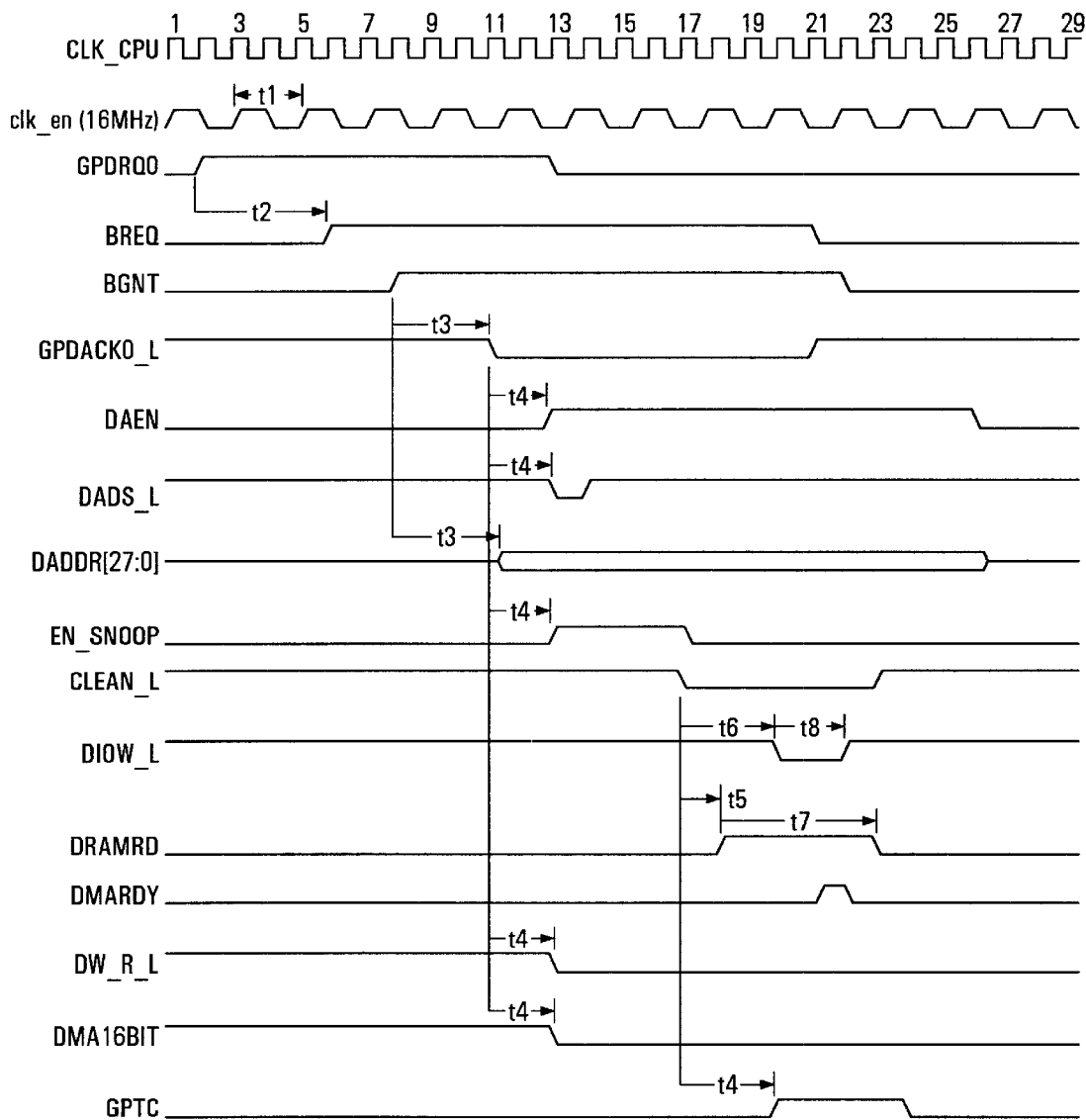
FIG. 7 is a timing diagram of an exemplary 8-bit DMA read operation in accordance with the GPDMAC of FIG. 3.

Turning now to FIG. 7, illustrated is an exemplary timing diagram of an 8-bit DMA read operation by the GP-bus DMA controller 22. The CLK_CPU signal described above in FIGS. 4 and 5 is a system clock and, in this example, is set to a speed of 33 MHz. A CLK_EN signal is a strobe for the GP-bus DMA controller 22 and is set based upon the value in the CLK_MODE bits 405 in the GP-DMA control register 401 described above in conjunction with FIG. 6a. In this example, the value of the CLK_MODE bits is "10" indicating a speed of 16 MHz.

On a rising edge of a clock pulse 2 of the CLK_CPU signal, a GPDRQO signal is asserted by an 8-bit device, or "8-bit initiator," such as a UART 40 or an external I/O or memory-mapped device located on the GP bus 72 indicating to the DMA controller 22 that DMA cycles are required by the initiator. The 8-bit device can be configured on either a 8-bit channel such as channel 0, channel 1 and channel 2 of the slave DMA controller 182 of the disclosed embodiment, or on a configurable width DMA channel in the enhanced mode such as channel 3 of the slave DMA controller 182 or channel 5, channel 6, or channel 7 of the master DMA controller 180. The target of a GP-bus DMA controller 22 transaction is typically the DRAM through the DRAM controller 20. On a rising edge of a clock pulse 6 of the CLK_CPU signal, the GP-bus DMA controller 22 asserts a BREQ signal to indicate to the BIU 34 that the GP-bus DMA controller 22 is requesting the GP-bus 72. A request for the GP-bus 72 is typically handled by the BIU 34. In this example, on the rising edge of a clock pulse 8 of the CLK_CPU signal, the BIU 34 grants the request asserted by the BREQ signal by asserting a BGNT signal. On the rising edge of a pulse 11 of the CLK_CPU signal, GPDACK[3:0] signals are asserted to indicate which external device's request is being serviced. On a falling edge of the pulse 11, an address of the requested data in the target device is then made available by the 8-bit initiator on DADDR[27:0].

On the rising edge of a clock pulse 13 of the CLK_CPU signal, several signals are either asserted or deasserted. A DAEN signal is asserted to indicate to external devices on the GP-bus 72 not to decode the address portion of the GP-bus 72. A DADS_L signal is asserted to indicate that there is a valid address on the DADDR[27:0] bus. An EN_SNOOP signal is asserted to indicate that the DMA address is valid and may be snooped. In this example, a DW_R_L signal is set to '0' to indicate the active transaction is a read transaction. On the same rising edge, a DMA16BIT signal is also set to '0' to indicate that the active transaction is an 8-bit transaction. Finally, the GPDRQ0 signal which was asserted on the rising edge of clock pulse 2 may be deasserted if the initiator has no more transfers.

On a falling edge of a clock pulse 14 of the CLK_CPU signal, the DADS_L signal which was asserted on the rising edge of clock pulse 13 is deasserted. On a falling edge of a clock pulse 17 of the CLK_CPU signal, the EN_SNOOP signal which was asserted on the rising edge of clock pulse 13 is deasserted. Also on the falling edge of the clock pulse 17, a CLEAN_L signal is asserted by the BIU 34 to indicate that the active DMA transaction is not accessing data stored in a cache (not shown) of the CPU 36. On a falling edge of a clock pulse 18 of the CLK_CPU signal, a DRAMRD signal is asserted to indicate a GP-bus 72 read cycle and indicating that the target device should place valid data on the GP-bus 72 for the 8-bit initiator to read.

On a rising edge of a clock pulse 20 of the CLK_CPU signal, the DIOW_L signal described above in conjunction with FIG. 3 is asserted by the target device to indicate to the 8-bit initiator that valid data is available on the GP-bus 72. On the rising edge of the clock pulse 20, a GPTC signal is also asserted to indicate that a current count stored in a current count register of the current transfer count registers 194 has rolled from "0h" to "FFFFh, in the case of an 8-bit channel, or from "0h" to FFFFFFh" when DMA controller 22 is in enhanced mode and employing a configurable width channel.

The current count register, as described in conjunction with FIG. 3, contains information relating to the size of the data buffer that is being transferred in the active transaction. In this example, only a one 8-bit transfer is taking place, otherwise, the GPTC signal would not be asserted until after repeated read cycles and the entire contents of the data buffer of the active transaction had been sent from the target device to the 8-bit initiator.

On a rising edge of a clock pulse 21 of the CLK_CPU signal, both the BREQ signal and the GPDACK0 signal are deasserted. On a falling edge of the clock pulse 21, a DMARDY signal is asserted by the SDRAM (not shown) that the data transfer has completed. On a rising edge of a clock pulse 22 of the CLK_CPU signal, the BGNT signal is deasserted and, on the falling edge of the clock pulse 22, the DIOW_L signal is desasserted. On a rising edge of a clock pulse 23 of the CLK_CPU signal, the DMARDY signal is deasserted and, on a falling edge of the clock pulse 23, both the DRAMRD signal and the CLEAN_L signal are deasserted. On a rising edge of a clock pulse 24 of the CLK_CPU signal, the GPTC signal is deasserted. On a rising edge of a clock pulse 26 of the CLK_CPU signal, the DAEN signal is deasserted and, finally, on a falling edge of the clock pulse 26, the address of the target data is no longer asserted on the DADDR[27:0] signals.

Figure 8:
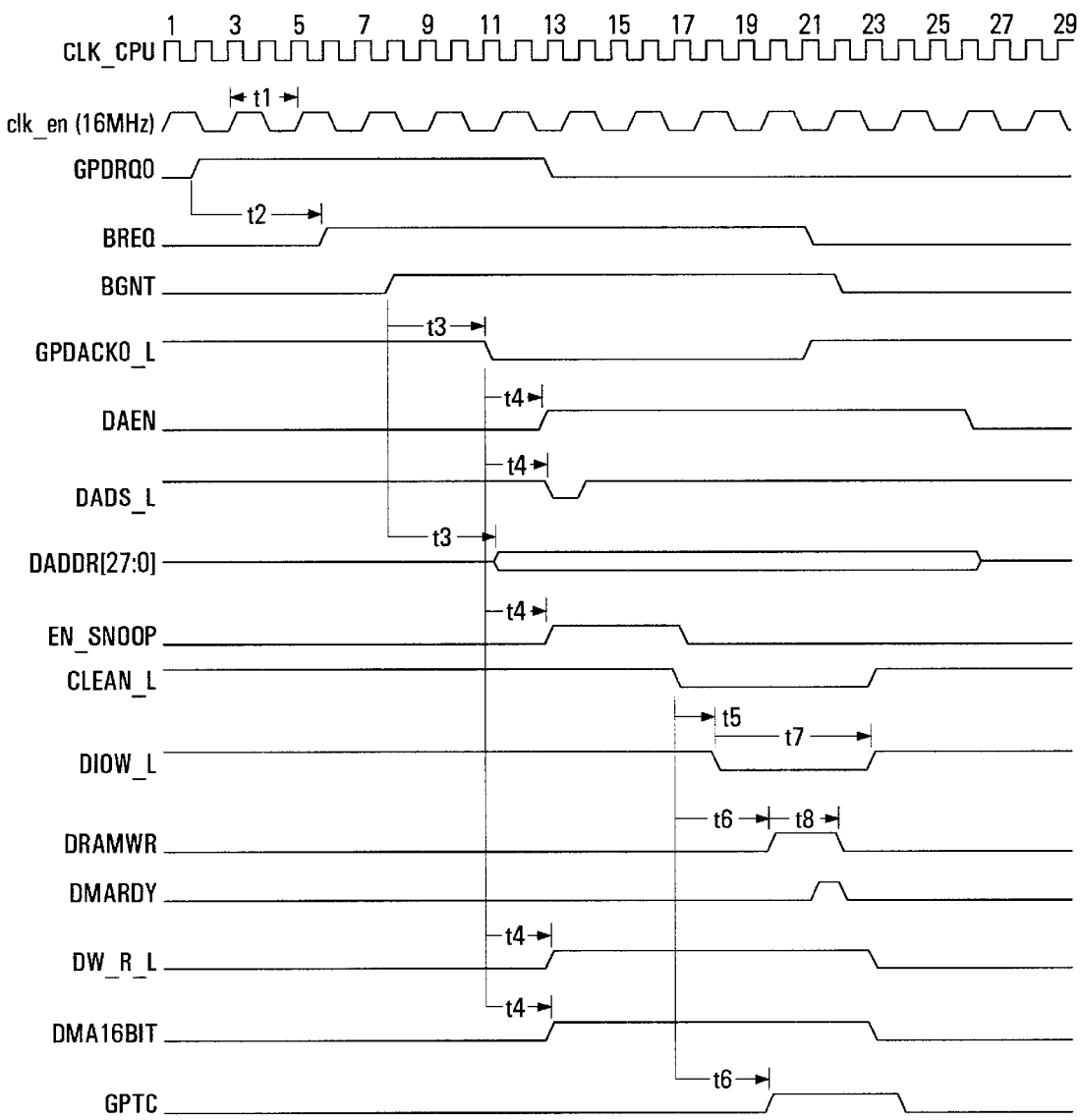
FIG. 8 is a timing diagram of an exemplary 16-bit DMA write operation in accordance with the GPDMAC of FIG. 3.

Turning now to FIG. 8, illustrated is an exemplary timing diagram for a 16-bit DMA write operation by the GP-bus DMA controller 22. On a rising edge of a clock pulse 2 of the CLK_CPU signal, a GPDRQ0 signal is asserted by an 16-bit device, or "16-bit initiator," such as an external I/O or memory-mapped 16-bit device located on the GP-bus 72 indicating to the DMA controller 22 that DMA cycles are required by the 16-bit initiator. In this example, the timing of the CLK_CPU signal, the CLK_EN signal, the BREQ signal, the BGNT signal, the GPDACK0 signals, the DAEN signal, the DADS_L signal, the DADDR[27:0] signals, the EN_SNOOP signal and the CLEAN_L signal are similar in timing and function to corresponding signals described above in conjunction with FIG. 7. However, the address on the DADDR[27:0] is the address that the data is being written to on the target device instead of the address data is being read from.

In this example, on a rising edge of clock pulse 13 of the CLK_CPU signal, a DW_R_L signal is set to '1' to indicate the active transaction is a write transaction. On the same rising edge, a DMA16BIT signal is also set to '1' to indicate that the active transaction is a 16-bit transaction. Because the active transaction is a write transaction, a DIOR_L signal is asserted on a rising edge of a clock pulse 20 of the CLK_CPU signal instead of the DIOR_L signal asserted in conjunction with the read transaction of FIG. 7. The DIOR_L signal is asserted by the target to indicate to the initiator that the target is ready to read the data that the initiator is seeking to write.

On the rising edge of a clock pulse 20, a DRAMWR signal is asserted by the initiator to indicate that valid data is available on the GP-bus 72 for the target to read. Also on the rising edge of the clock pulse 20, the GPTC signal is asserted to indicate that a current count stored in a current count register of the current transfer count registers 194 has rolled from "0h" to "FFFFFFh." The current count register, as described in conjunction with FIG. 3, contains information relating to the size of the data buffer that is being transferred in the active transaction. In this example, only a one 16-bit transfer is taking place, otherwise, the GPTC signal would not be asserted until after repeated write cycles and the entire contents of the data buffer of the active transaction had been sent.

On the rising edge of a clock pulse 21, a DMARDY signal is asserted by the SDRAM (not shown) indicating that the requested data transfer is complete. The DMARDY is deasserted on a rising edge of a clock pulse 22. Also, on the rising edge of the clock pulse 22, the DRAMWR signal is deasserted. On a rising edge of a clock pulse 23, the DIOR_L signal is deasserted; the DW_R_L signal is deasserted; and the DMA16BIT signal is deasserted. Finally, on a rising edge of a clock pulse 24 the GPTC signal may be deasserted if the initiator has no more transfers.

Figure 9:
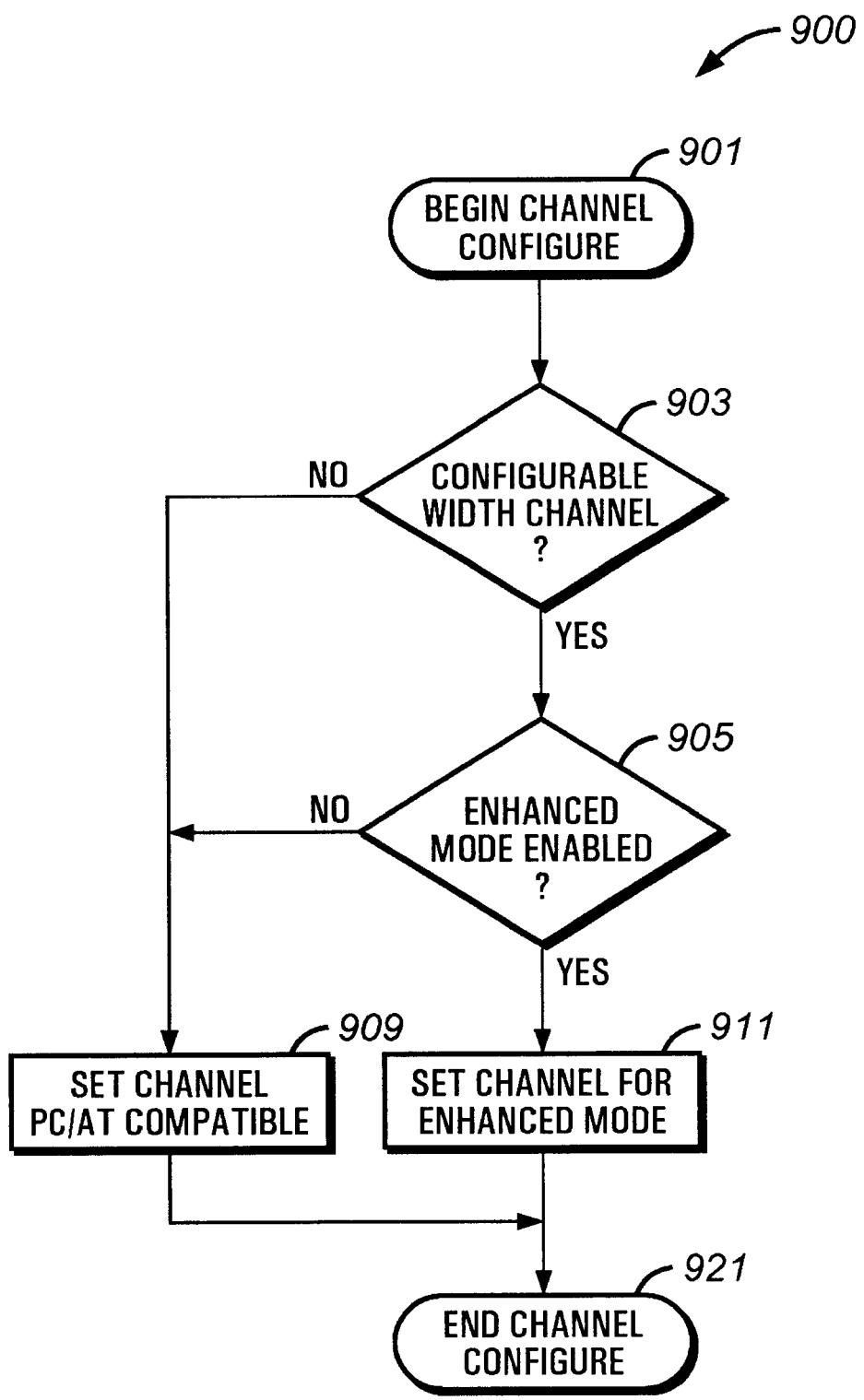
FIG. 9 is a flowchart illustrating the configuration of a configurable width channel of the GPDMAC of FIG. 3.

Turning now to FIG. 9, illustrated is a flowchart of a DMA channel width configuration process 900. It should be noted that the process 900 can be implemented in hardware or software under programmer control. Control of the channel width configuration process 900 begins in a "Begin Channel Configuration" step 901 and proceeds immediately to step 903 where the DMA controller 22 (or the software that runs it) determines whether the active channel is a configurable width DMA channel. If the GP-bus DMA controller 22 determines that the active channel is not a configurable width channel, then control proceeds to step 909 where the active channel is configured for standard PC/AT compatible operation. In other words, the active channel is configured for 8-bit operation or 16-bit operation, with a 24-bit address range or space and with a 16-bit transfer count. In the disclosed embodiment, the channels which are not width configurable are channel 0, channel 1 and channel 2 of the slave DMA controller 182. Channel 0, channel 1 and channel 2 are already configured for PC/AT compatibility but, in the alternative, the non-configurable width channels may also have extended address registers, extended transfer count registers or width configurability. Also in the alternative, any channel of the GP-bus DMA controller 22 may be configurable width. Control then Proceeds to step 921 where the channel, configuration process is complete.

If the GP-bus DMA controller 22 determines that the active channel is a configurable width channel, then control proceeds to step 905 where the GP-bus DMA controller 22 determines whether the enhanced mode is enabled by checking the ENH_MODE_ENB bit 409 of the GPDMABCTL register 401, both described above in conjunction with FIG. 6a. If the ENH_MODE_ENB bit 409 is set to the value '0', then control proceeds to step 909 where the active channel is configured or programmed for PC/AT compatible operation. For example, if channel 3 is the active channel, it is configured or programmed for 8-bit operation, with a 24-bit address range or space and with a 16-bit transfer count. If channel 5, channel 6, or channel 7 are the active channel, then the active channel is configured for 16-bit operation, with a 24-bit address space and with a 16-bit transfer count. Control then proceeds to step 921 where the channel configuration process 900 is complete.

If the ENH_MODE_ENB bit 409 is set to a value of '1', then control proceeds to step 907 where the active channel is configured in the enhanced mode as described below in conjunction with FIG. 10. Control then proceeds to step 921 where the channel configuration process 900 is complete.

Figure 10:
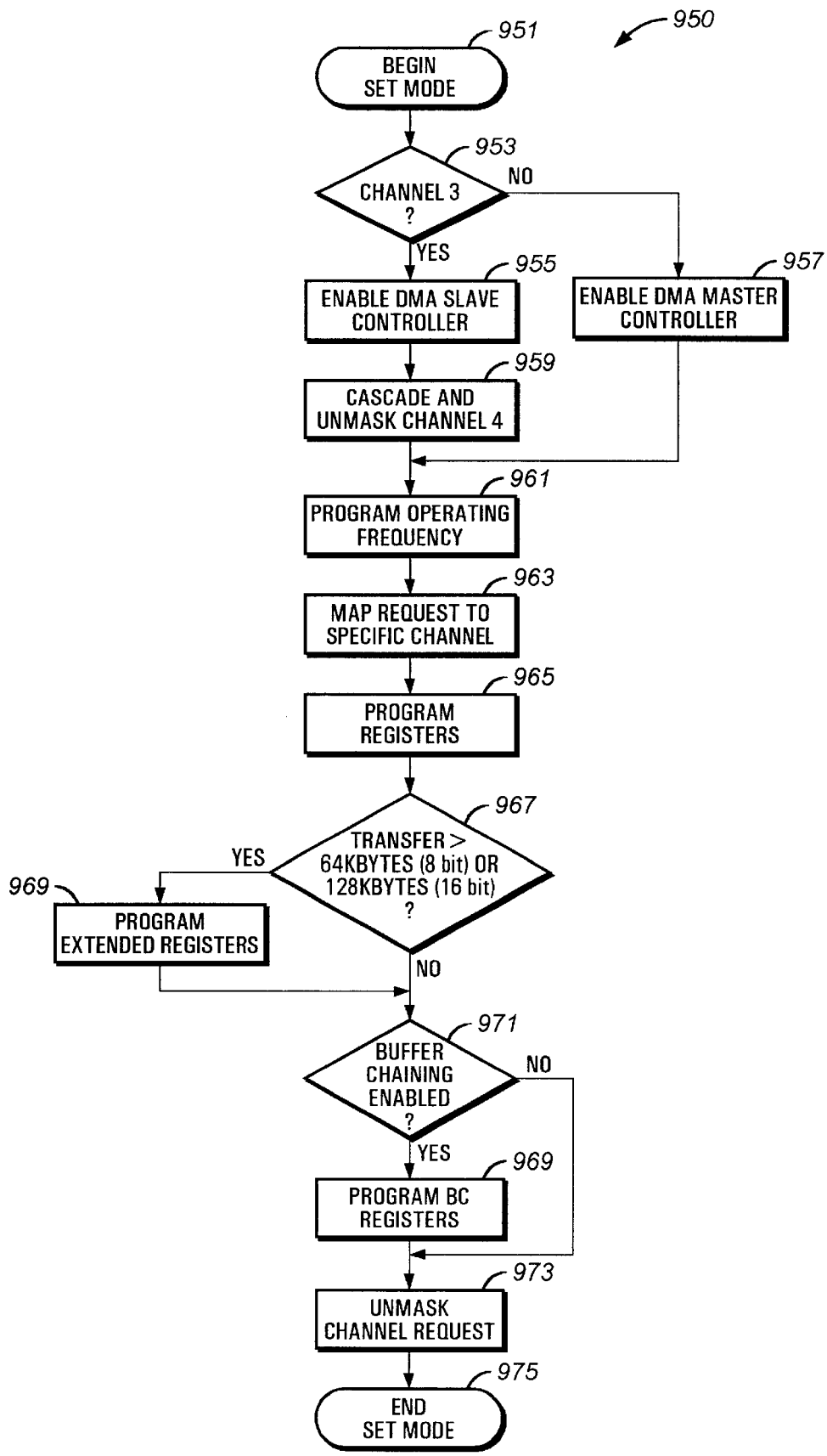
FIG. 10 is a flowchart illustrating the configuration of a configurable width channel in an enhanced mode.

Turning now to FIG. 10, illustrated is "Begin Set Mode" process 950. The process 950 corresponds to step 911 described above in conjunction with FIG. 9 and, therefore applies to the configurable width channels, or channels 3, 5, 6 and 7 in the disclosed embodiment. Control proceeds immediately to step 953 where the GP-bus DMA controller 22 determines whether the active channel is channel 3 of the slave DMA controller 182. If the active channel is channel 3, control proceeds to step 955 where the slave DMA controller 182 is enabled by asserting a DMA1_CS signal described above in conjunction with FIG. 3. Next, in step 955, the cascade function of channel 4 of the slave DMA controller 182 is enabled and channel 4 is unmasked. Step 955 is understood by those with knowledge in the art. Control then proceeds to step 961 where the operating speed of the GP-bus DMA controller 22 is set as described above in FIG. 6a.

If in step 953 the GP-bus DMA controller 22 determines that the active channel is not channel 3, control proceeds to step 957 where the master DMA controller 180 is enabled by asserting the DMA0_CS signal as described above in conjunction with FIG. 3. Next control proceeds to step 961 where the operating speed of the GP-bus DMA controller 22 is set as described above in conjunction with FIG. 6a. After step 961, control proceeds to step 963 where the data request is mapped to a specific channel. Control then proceeds to step 965 where the enhanced mode is enabled for the specific channel as described above in conjunction with FIG. 6a. Also in step 965, the corresponding memory address (either the slave memory address register 183 of the master memory address register 181), the corresponding transfer count register or the transfer count registers (not shown), the corresponding page register of the plurality of page address registers 189 and the corresponding extended page register of the extended page registers 172 are programmed. Control then proceeds to step 967 if the data to be transferred is greater than 64 Kbytes in an 8-bit channel or 128 Kbytes in a 16-bit channel, otherwise control proceeds to step 971. In step 969, the corresponding extended page register of the extended registers 188 are programmed and then control proceeds to step 971.

In step 971, the GP-bus DMA controller 22 checks a corresponding buffer chaining bit and, if set control proceeds to step 969 where buffer chaining registers are programmed. The buffer chaining aspects of the disclosed embodiment are described in more detail in the commonly owned U.S. patent application entitled "BUFFER CHAINING" incorporated by reference herein. Once the buffer chaining registers are programmed or if the corresponding buffer chaining bit is not set, control proceeds to step 973 where the corresponding request channel is unmasked and the DMA request can be performed by the GP-bus DMA controller 22. Finally, control proceeds to step 975 where the configuration of the active channel in the enhanced mode is complete.

It should be understood that the order and timing of the steps in FIG. 9 and FIG. 10 are illustrative of the disclosed embodiment and may be changed without departing from the spirit of the invention.

The foregoing disclosure and description of the various embodiments are illustrative and explanatory thereof, and various changes in the descriptions and attributes of the microcontroller, signaling, registers, DMA channels and other circuitry, the organization of the components, and the order and timing of steps taken, as well as in the details of the illustrated system may be made without departing from the spirit of the invention. While an exemplary DMA controller is described in the context of a microcontroller, it shall be understood that a DMA controller according to the described techniques can be implemented in a variety of other processor-based systems. Further, while the exemplary DMA controller is described in connection with PC/AT compatibility, it should be understood that a DMA controller according to the disclosed techniques can be implemented to serve a variety of non-PC/AT purposes.

What we claim is:

1. A direct memory access (DMA) controller with DMA channel width configurability support, the DMA controller comprising:

DMA control logic;

a master DMA controller coupled to the DMA control logic;

a slave DMA controller coupled to the DMA control logic;

a plurality of DMA channels, coupled to the DMA master controller with a plurality of DMA channel width configurations determined by the DMA control logic; and a plurality of channel width configuration bits to select between x-bit operation and y-bit operation of the plurality of DMA channels.

2. The DMA controller of claim 1, wherein the plurality of DMA channels are selectively configurable to either x-bit operation or y-bit operation.

3. The DMA controller of claim 2, wherein the x-bit operation comprises 8-bit operation and the y-bit operation comprises 16-bit operation.

4. The DMA controller of claim 1, further comprising:

a plurality of transfer count registers coupled to the plurality of DMA channels and selectively configured to either b-bit operation or c-bit, operation.

5. The DMA controller of claim 4, the DMA control logic comprising:

a transfer count configuration bit to select between the b-bit operation and the c-bit operation of the plurality of transfer count registers.

6. The DMA controller of claim 4, wherein the b-bit operation comprises 16-bit operation and the c-bit operation comprises 24-bit operation.

7. The DMA controller of claim 1, further comprising:

an address generation logic coupled to the plurality of DMA channels and selectively configured to either d-bit operation and e-bit operation.

8. The DMA controller of claim 7, the DMA control logic comprising:
a plurality of address configuration bits to select between the d-bit operation and the e-bit operation.

9. The DMA controller of claim 7, wherein the d-bit operation comprises 16-bit operation and the e-bit operation comprises 28-bit operation.

10. a microcontroller configured for direct memory access (DMA) channel width configurability support, comprising:
a bus;
a processor coupled to the bus; and
a DMA controller coupled to the bus, the DMA controller comprising:
DMA control logic;
a master DMA controller coupled to the DMA control logic;
a slave DMA controller coupled to the DMA control;
a plurality of DMA channels coupled to the DMA master controller with a plurality of DMA channel width configurations determined by the DMA control logic; and
a plurality of channel size configuration bits to select between x-bit operation and y-bit operation.

11. The microcontroller of claim 10, wherein the plurality of DMA channels are selectively configurable to either x-bit operation or y-bit operation.

12. The microcontroller of claim 11, wherein the x-bit operation comprises 8-bit operation and the y-bit operation comprises 16-bit operation.

13. The microcontroller of claim 10, the DMA controller further comprising:
a plurality of transfer count registers coupled to the plurality of DMA channels and selectively configured to either b-bit operation or c-bit operation.

14. The microcontroller of claim 13, wherein the DMA control logic comprises a transfer count configuration bit to select between the b-bit operation and the c-bit operation.

15. The microcontroller of claim 13, wherein the b-bit operation comprises 16-bit operation and the c-bit operation comprises 24-bit operation.

16. The microcontroller of claim 10, the DMA controller further comprising:
an address generation logic coupled to the plurality of DMA channels and selectively configured to either d-bit operation and e-bit operation.

17. The microcontroller of claim 16, the DMA control logic comprising:
an address configuration bit to select between the d-bit operation and the e-bit operation.

18. The microcontroller of claim 16, wherein the d-bit operation comprises 16-bit operation and the e-bit operation comprises 28-bit operation.

19. The microcontroller of claim 10, wherein the plurality of DMA channels are configured to four 8-bit channels and three 16-bit channels.

* * * * *